US011750851B2

(12) United States Patent
Kawanishi et al.

(10) Patent No.: US 11,750,851 B2
(45) Date of Patent: Sep. 5, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hajime Kawanishi, Kanagawa (JP); Yasuo Okutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/122,512

(22) Filed: Dec. 15, 2020

(65) Prior Publication Data

US 2021/0099734 A1 Apr. 1, 2021

Related U.S. Application Data

(63) Continuation of application No. PCT/JP2019/022308, filed on Jun. 5, 2019.

(30) Foreign Application Priority Data

Jun. 18, 2018 (JP) .................................. 2018-115280

(51) Int. Cl.
*H04N 21/218* (2011.01)
*G06F 3/14* (2006.01)
(Continued)

(52) U.S. Cl.
CPC ......... *H04N 21/21805* (2013.01); *G06F 3/14* (2013.01); *G06T 15/20* (2013.01); *H04N 21/2387* (2013.01); *H04N 21/816* (2013.01)

(58) Field of Classification Search
None
See application file for complete search history.

(56) References Cited

U.S. PATENT DOCUMENTS 10,291,875 B2 * 5/2019 Tanaka .................. H04N 23/90
2011/0293241 A1 * 12/2011 Umeyama ............ G11B 27/105
386/E5.028
(Continued)

FOREIGN PATENT DOCUMENTS

JP 2014215828 A 11/2014
JP 2017212593 A 11/2017

*Primary Examiner* — Gelek W Topgyal
(74) *Attorney, Agent, or Firm* — Canon U.S.A., Inc. IP Division (57) ABSTRACT

An apparatus 103 stores, in a storage unit, a plurality of parameters for generation of a virtual viewpoint image based on a plurality of captured images, the plurality of parameters including a parameter representing a time and a parameter representing a position of a virtual viewpoint and a direction of view from a virtual viewpoint corresponding to the time, and causes, in accordance with a switching operation performed while a virtual viewpoint image is being displayed on a display unit, the display unit to display a virtual viewpoint image corresponding to a parameter representing a time selected from the plurality of parameters stored in the storage unit based on the switching operation, and corresponding to a parameter representing a position of a virtual viewpoint and a direction of view from a virtual viewpoint corresponding to the virtual viewpoint image being displayed.

10 Claims, 8 Drawing Sheets

(51) Int. Cl.
*G06T 15/20* (2011.01)
*H04N 21/2387* (2011.01)
*H04N 21/81* (2011.01)

(56) References Cited

U.S. PATENT DOCUMENTS

| | | | | |
|---|---|---|---|---|
| 2017/0123504 A1* | 5/2017 | Kim | ........................ | G06F 3/0346 |
| 2017/0178266 A1* | 6/2017 | Schmidt | ................. | G06F 40/134 |
| 2017/0316806 A1* | 11/2017 | Warren | ................. | G11B 27/031 |
| 2018/0183999 A1* | 6/2018 | Hasegawa | ................. | G06T 1/00 |
| 2020/0322591 A1* | 10/2020 | Yano | ........................ | H04N 23/90 |

* cited by examiner

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2019/022308, filed Jun. 5, 2019, which claims the benefit of Japanese Patent Application No. 2018-115280, filed Jun. 18, 2018, both of which are hereby incorporated by reference herein in their entirety.

BACKGROUND

Field

The present disclosure relates to an information processing apparatus, an information processing method, and a storage medium.

Background Art

In recent years, a technology for generating a virtual viewpoint image, which is an image from a virtual viewpoint (a viewpoint that is virtual), has received attention, the technology using a plurality of images captured in a synchronous manner by a plurality of image capturing devices from a plurality of viewpoints, these image capturing devices being installed at different positions.

Generation and viewing of a virtual viewpoint image can be realized, for example, by collecting images captured by a plurality of image capturing devices into a server or the like and by the server or the like, into which images are collected, performing processing such as rendering based on a virtual viewpoint and displaying a virtual viewpoint image on a user terminal.

For a service using such a virtual viewpoint image, for example, content from an impactful viewpoint is created by a content creator from images obtained by capturing a soccer or basketball game. Moreover, the user watching the content can watch the game while freely moving his/her viewpoint by himself/herself, and thus a greater sense of realism can be given to the user compared with that from conventionally captured images.

It may take effort for a user to decide upon a virtual viewpoint in order to generate a virtual viewpoint image. Regarding this problem, in PTL 1, it is disclosed that viewpoint information on a certain user is recommended to other users.

CITATION LIST

Patent Literature

PTL 1: Japanese Patent Laid-Open No. 2014-215828

However, with the conventional technology, the ease of operation regarding the setting of a virtual viewpoint may be insufficient. For example, the user may want to edit a virtual viewpoint of virtual viewpoint image content corresponding to a certain period after having set the virtual viewpoint. In such a case, if the user finds a time for which the virtual viewpoint should be corrected and newly sets all parameters for, for example, the position, direction, and angle of view of the virtual viewpoint for the time again, the user may have to spend a great deal of effort.

SUMMARY

According to one aspect of the present disclosure, there is provided an information processing apparatus according to the present disclosure has, for example, the following configuration. That is, the information processing apparatus includes a storage control unit configured to stores, in a storage unit, a plurality of parameters for generation of a virtual viewpoint image based on a plurality of captured images, the plurality of parameters including a parameter representing a time and a parameter representing a position of a virtual viewpoint and a direction of view from a virtual viewpoint corresponding to the time, and a display control unit configured to cause, in accordance with a switching operation performed by a user while a virtual viewpoint image is being displayed on a display unit, the display unit to display a virtual viewpoint image corresponding to a parameter representing a time selected from the plurality of parameters stored in the storage unit based on the switching operation, and corresponding to a parameter representing a position of a virtual viewpoint and a direction of view from a virtual viewpoint corresponding to the virtual viewpoint image being displayed on the display unit.

Further features of the present disclosure will become apparent from the following description of exemplary embodiments with reference to the attached drawings.

DESCRIPTION OF THE EMBODIMENTS

In the following, an example of an embodiment of the present disclosure will be described in detail on the basis of the drawings.

First Embodiment

In a present embodiment, processing performed by an image processing system 10, which will be described later with reference to FIG. 1, will be described. More specifically, processing will be described in which the image processing system 10 stores conditions (the position of a virtual viewpoint, a virtual line-of-sight direction, and so on) regarding virtual viewpoint image generation in a storage unit, and stored conditions are reproduced when a playback time in virtual viewpoint image content is changed. In the following, conditions regarding virtual viewpoint image generation are referred to as generation conditions. A virtual viewpoint image is an image from a virtual viewpoint (a viewpoint that is virtual), the image being generated using a plurality of captured images captured by a plurality of image capturing devices from a plurality of viewpoints. That is, a virtual viewpoint image is an image seen from a virtual viewpoint in the direction of a line of sight that is virtual (hereinafter referred to as a virtual line of sight) with an angle of view that is virtual (hereinafter referred to as a virtual angle of view). Moreover, a virtual viewpoint image can also be regarded as an image captured with a virtual angle of view in the direction of a virtual line of sight by a camera that is virtual (hereinafter referred to as a virtual camera) arranged at a virtual viewpoint. Virtual viewpoint image content is a moving image from a virtual viewpoint (a viewpoint that is virtual), the moving image being generated using a plurality of moving images captured from a plurality of viewpoints.

Generation conditions are, for example, conditions expressed by a parameter set including at least one of parameters regarding the position of a virtual viewpoint, the direction of a virtual line of sight, a virtual angle of view, and a time corresponding to a drawing target (for example, a playback time of the virtual viewpoint image in virtual viewpoint image content, an actual time under circumstances of the drawing target, or the like). A condition regarding a time corresponding to a drawing target is an example of a time condition. A time corresponding to a drawing target is a time indicating which time the circumstances to be drawn in a virtual viewpoint image are for, and examples of the time include an actual time of the circumstances and a playback time of a virtual viewpoint image in which the circumstances are drawn in virtual viewpoint image content. Moreover, the generation conditions include, for example, a condition regarding processing performed on the virtual viewpoint image (for example, monochrome processing, effect addition processing, or the like).

Through this processing, the image processing system 10 can more easily reproduce the generation conditions determined in the past than in the case where the user reproduces the generation conditions by operating an operation unit.

When virtual viewpoint image content is provided in a conventional manner, the user can freely operate a virtual viewpoint and a virtual line of sight (the position and orientation of a virtual camera). Here, for example, in a case where, at a playback time for which viewing has already been performed one time, the user wants to view the image from the same position and orientation of the virtual camera as the last time, the user needs to perform substantially the same operation as the last time to reproduce the position and orientation of the virtual camera, and the operation is complicated.

Thus, in the present embodiment, processing will be described in which the time at which a virtual viewpoint image was generated and information indicating generation conditions (for example, the position, orientation, and the like of a virtual camera) are associated with each other and stored, and the conditions indicated by the stored information are applied when predetermined processing is executed. As a result, without performing complicated operation, the user can reproduce the conditions set in the past for a target playback time. Processing for reproducing only a selected condition will also be described.

Figure 1A:
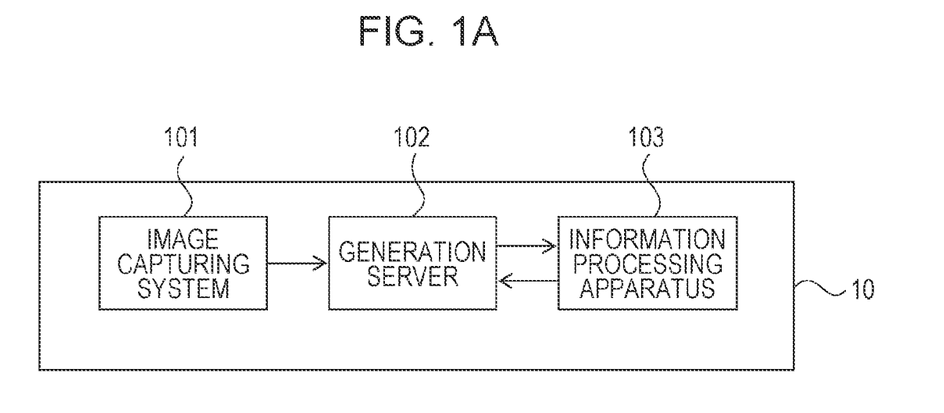
FIG. 1A is a diagram illustrating an example of a system configuration and the like of an image processing system.

FIG. 1A is a diagram illustrating an example of a system configuration of the image processing system 10, which is a system that generates virtual viewpoint images.

The image processing system 10 includes an image capturing system 101, a generation server 102, and an information processing apparatus 103. The generation server 102 is connected to each of the image capturing system 101 and the information processing apparatus 103 such that two-way communication is possible via a network.

The image capturing system 101 includes a plurality of cameras each arranged at a corresponding one of different positions, and captures a plurality of images in a synchronous manner from a plurality of respective different viewpoints via the plurality of cameras. The image capturing system 101 transmits the plurality of images captured in a synchronous manner from the plurality of viewpoints to the generation server 102.

Figure 2:
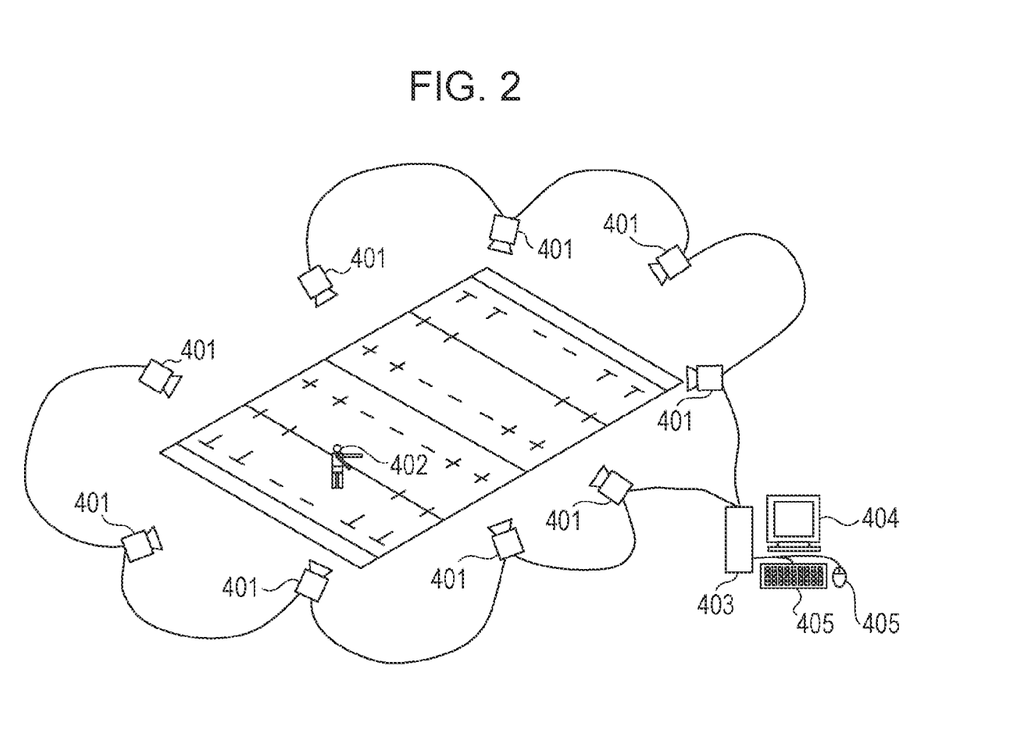
FIG. 2 is a diagram for describing an example of a system configuration of an image capturing system.

FIG. 2 is a diagram illustrating an example of a system configuration of the image capturing system 101. The image capturing system 101 includes a plurality of cameras 401, an image capturing control device 403, a display device 404, and an input device 405. In the example in FIG. 2, the image capturing system 101 controls the plurality of cameras 401, which are arranged so as to surround a subject 402, via the image capturing control device 403 to perform image capturing.

Each of the cameras 401 is an image capturing device such as a network camera or a surveillance camera that can capture images at synchronous timings with the other cameras 401.

The image capturing control device 403 and the plurality of cameras 401 are connected to each other in a daisy-chain manner but may be connected to each other in a star manner. The image capturing control device 403 is an information processing apparatus such as a personal computer (PC) or a server device that controls the plurality of cameras 401, receives images captured by the plurality of cameras 401, and transmits the received images to the generation server 102. The display device 404 is a display device such as a monitor. The input device 405 is an input device such as a mouse and a keyboard.

The generation server 102 is an information processing apparatus such as a PC or a server device that generates a virtual viewpoint image (captured by a virtual camera) seen from a virtual viewpoint, on the basis of a plurality of images captured in a synchronous manner by the image capturing system 101 from a plurality of respective different viewpoints. The virtual camera is a virtual camera that can freely move in an image capturing space. The position and orientation of the virtual camera are expressed by camera parameters of the virtual camera determined by the information processing apparatus 103. In the following, the camera parameters of the virtual camera are referred to as virtual camera parameters.

The generation server 102 sequentially generates virtual viewpoint images from a plurality of images received from the image capturing system 101. Unless otherwise specified, images in the following description indicate a concept including both moving images and still images. That is, the image processing system 10 can process both still images and moving images.

The information processing apparatus 103 is an information processing apparatus such as a PC, a server device, or a tablet device. The information processing apparatus 103 controls conditions regarding a virtual camera (conditions such as a virtual viewpoint, a virtual line of sight, and a virtual angle of view) to determine virtual camera parameters. In addition, the information processing apparatus 103 determines a time indicating which playback time a virtual viewpoint image is to be generated for in the virtual viewpoint image content.

The virtual camera parameters are expressed by a three-dimensional position (three axes) and an orientation (three axes). The information processing apparatus 103 transmits the determined virtual camera parameters and time to the generation server 102. Next, the generation server 102 generates a virtual viewpoint image on the basis of the received virtual camera parameters and a parameter representing the time and transmits the virtual viewpoint image to the information processing apparatus 103. The information processing apparatus 103 exhibits the received virtual viewpoint image to the user by displaying the received virtual viewpoint image in a camera view 301 to be described later with reference to FIG. 4.

Figure 1B:
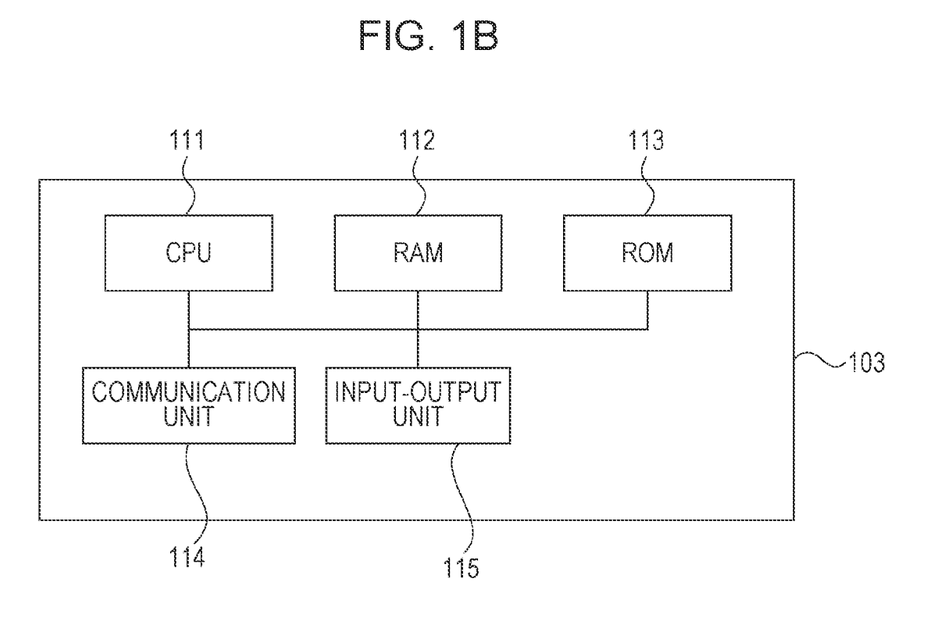
FIG. 1B is a diagram illustrating an example of the system configuration and the like of the image processing system.

FIG. 1B is a diagram illustrating an example of a hardware configuration of the information processing apparatus 103. The information processing apparatus 103 includes a central processing unit (CPU) 111, a random access memory (RAM) 112, a read only memory (ROM) 113, a communication unit 114, and an input-output unit 115. The individual elements are connected to each other such that two-way communication is possible via a system bus.

The CPU 111 is a central processing unit that controls the entire information processing apparatus 103 using programs and data stored in the RAM 112 and the ROM 113. The RAM 112 is a storage device that functions as a storage area for temporarily storing, for example, a computer program read out from the ROM 113, data in the middle of calculation, or data supplied from the outside via the communication unit 114 or as a work area of the CPU 111. The ROM 113 is a storage device that stores, for example, various programs and data that need not be changed, virtual viewpoint images, images captured by the cameras 401, generation conditions, and a reproduction condition. The ROM 113 is an example of a storage unit.

The communication unit 114 is an interface used to communicate with external devices such as Ethernet and USB. The CPU 111 communicates with the generation server 102 via the communication unit 114. The input-output unit 115 is an interface used to connect to input devices such as a keyboard and a mouse and output devices such as monitors. The CPU 111 accepts input from the user through the input-output unit 115. The input-output unit 115 is connected to an input device, examples of which are a contact sensor, a mouse, a keyboard, and a remote controller. Moreover, the input-output unit 115 is connected to an output device, examples of which are a monitor and a display unit of a touch panel. In the present embodiment, the input-output unit 115 is connected to a display device 201 and controllers 202 and 203 to be described later with reference to FIG. 3.

Figure 6:
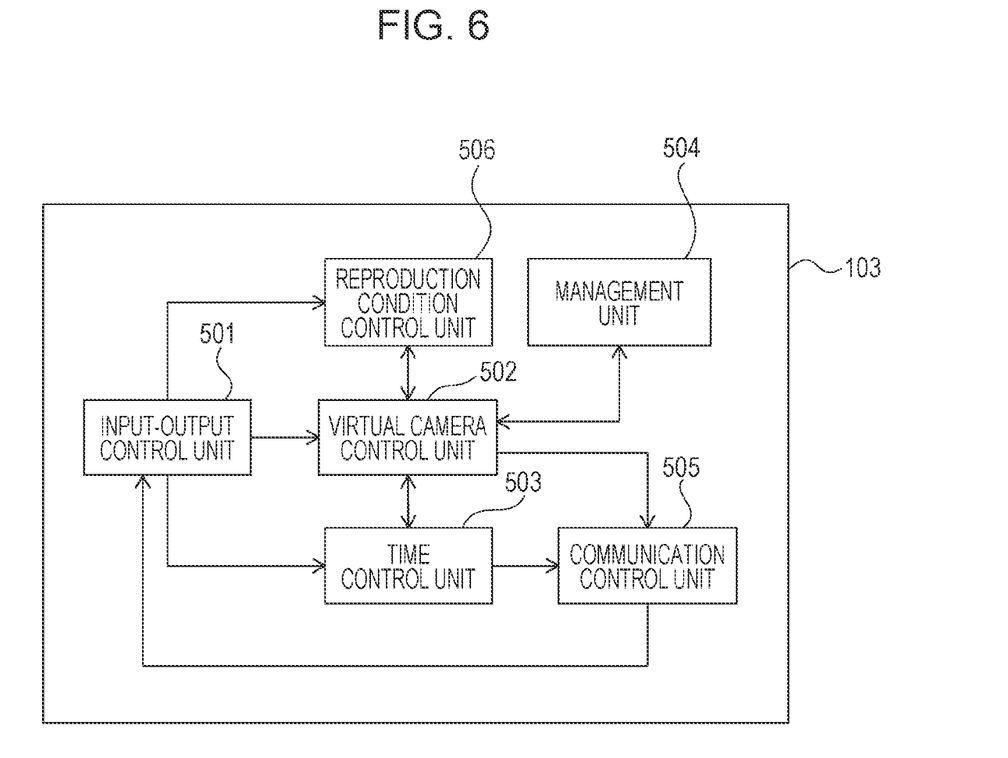
FIG. 6 is a diagram illustrating an example of a functional configuration of an information processing apparatus.
Figure 7:
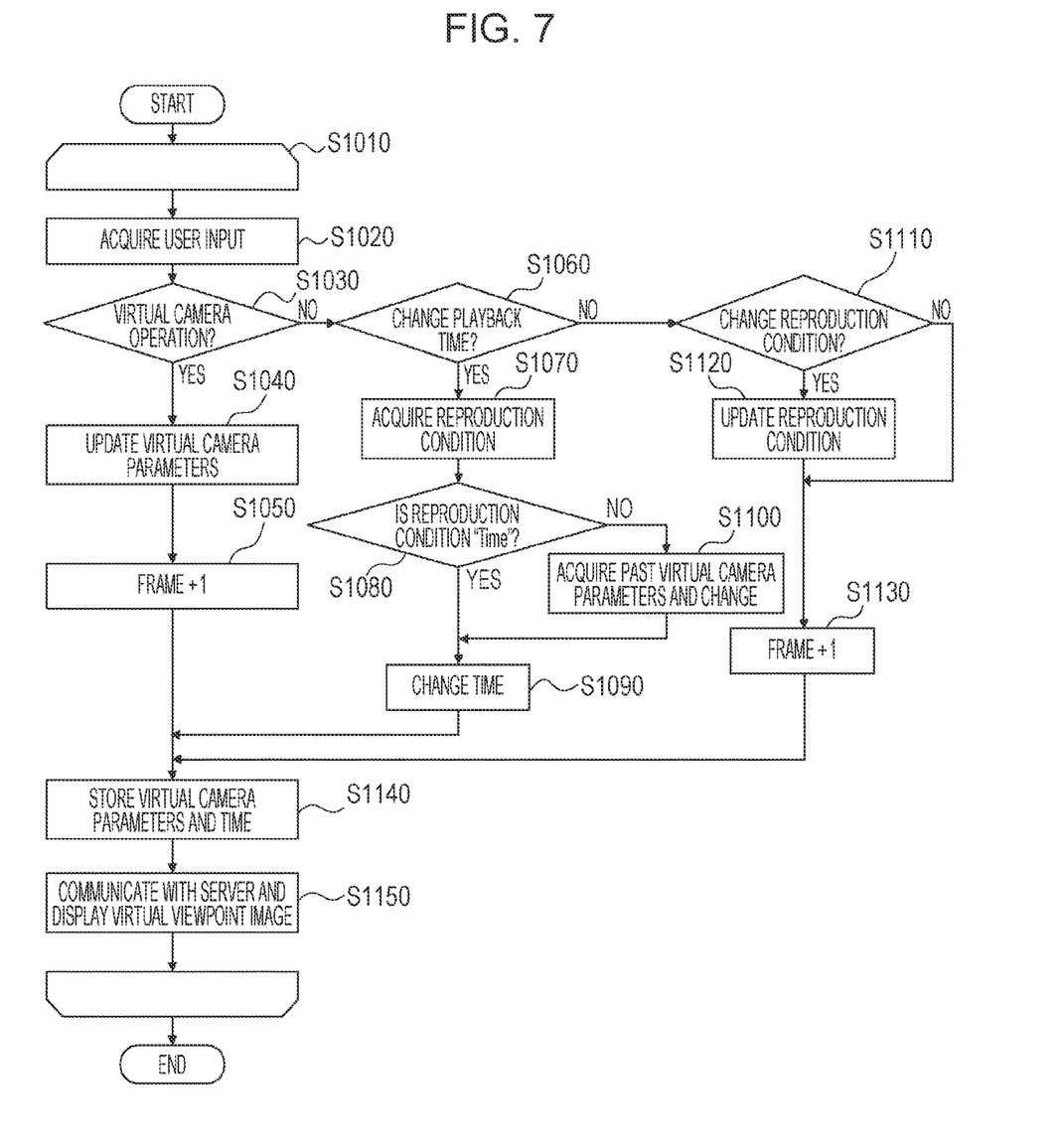
FIG. 7 is a flow chart illustrating an example of processing performed by the information processing apparatus.
Figure 9:
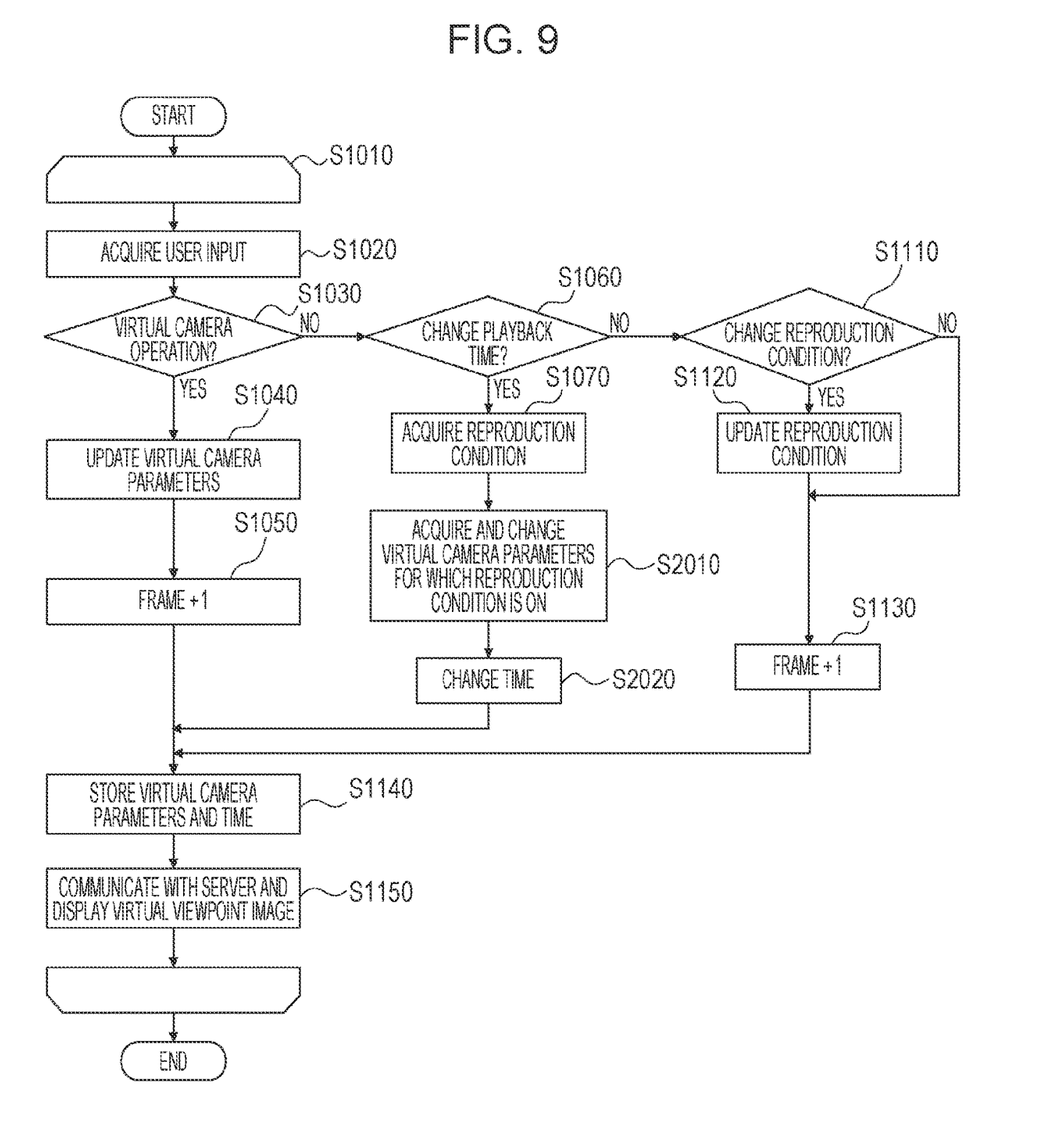
FIG. 9 is a flow chart illustrating an example of processing performed by the information processing apparatus.

For example, the function to be described later with reference to FIG. 6 and the processing in flow charts to be described later with reference to FIGS. 7 and 9 are realized by the CPU 111 executing processing in accordance with a program stored in, for example, the ROM 113.

In the present embodiment, the hardware configuration of the generation server 102 is similar to the hardware configuration of the information processing apparatus 103 illustrated in FIG. 1B. In addition, the hardware configuration of the image capturing control device 403 is also similar to the hardware configuration of the information processing apparatus 103 illustrated in FIG. 1B.

The function of the generation server 102 and the processing performed by the generation server 102 are realized by the CPU of the generation server 102 executing processing in accordance with a program stored in, for example, a ROM of the generation server 102.

The function of the image capturing control device 403 and the processing performed by the image capturing control device 403 are realized by the CPU of the image capturing control device 403 executing processing in accordance with a program stored in, for example, a ROM of the image capturing control device 403.

Figure 3:
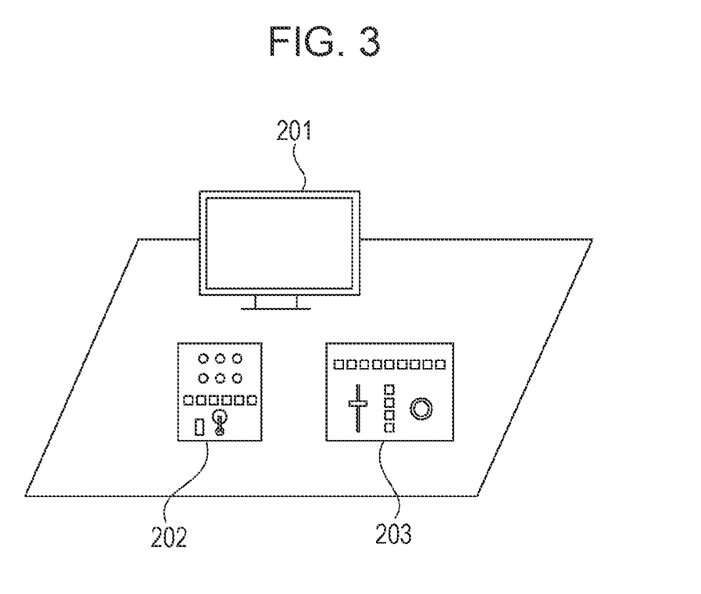
FIG. 3 is a diagram for describing an example of devices connected to an input-output unit.

FIG. 3 is a diagram for describing an example of input devices and an output device connected to the input-output unit 115. In the example in FIG. 3, the single display device 201 and the two controllers 202 and 203 are connected to the input-output unit 115.

The display device 201 is a display device that displays, for example, a virtual viewpoint image. In the present embodiment, the display device 201 is a display device that allows a touch input to a display unit.

The controller 202 is a controller used to control the position and orientation of the virtual camera. The controller 202 includes a joystick that enables six-axis operation for the position (three axes) and orientation (three axes) of the virtual camera. Due to the controller 202, the user can freely operate a virtual viewpoint and a virtual line of sight (the position and orientation of the virtual camera) for when a virtual viewpoint image is generated.

The controller 203 is a controller used to control a playback time in virtual viewpoint image content. The controller 203 includes a wheel used to fast-forward or rewind the playback time. The controller 203 includes a change button used to change the reproduction condition, which is a condition indicating which condition or conditions are to be reproduced among the generation conditions. The controller 203 includes a storage command button used to associate, for example, a playback time in virtual viewpoint image content with virtual camera parameters at the time of generation of a virtual viewpoint image at the playback time to store the associated information as condition information indicating generation conditions. Due to the controller 203, the user can freely change the playback time in the virtual viewpoint image content and can perform continuous time operation such as fast forward or rewind. In addition, in a case where the user wants to store conditions such as virtual camera parameters for an important scene or the like, the user can send, by pressing down the storage command button, a command to store condition information corresponding to the scene at a time corresponding to the timing of the operation.

Two or more display devices may be connected to the input-output unit 115. In addition, one controller or three or more controllers may be connected to the input-output unit 115.

Figure 4:
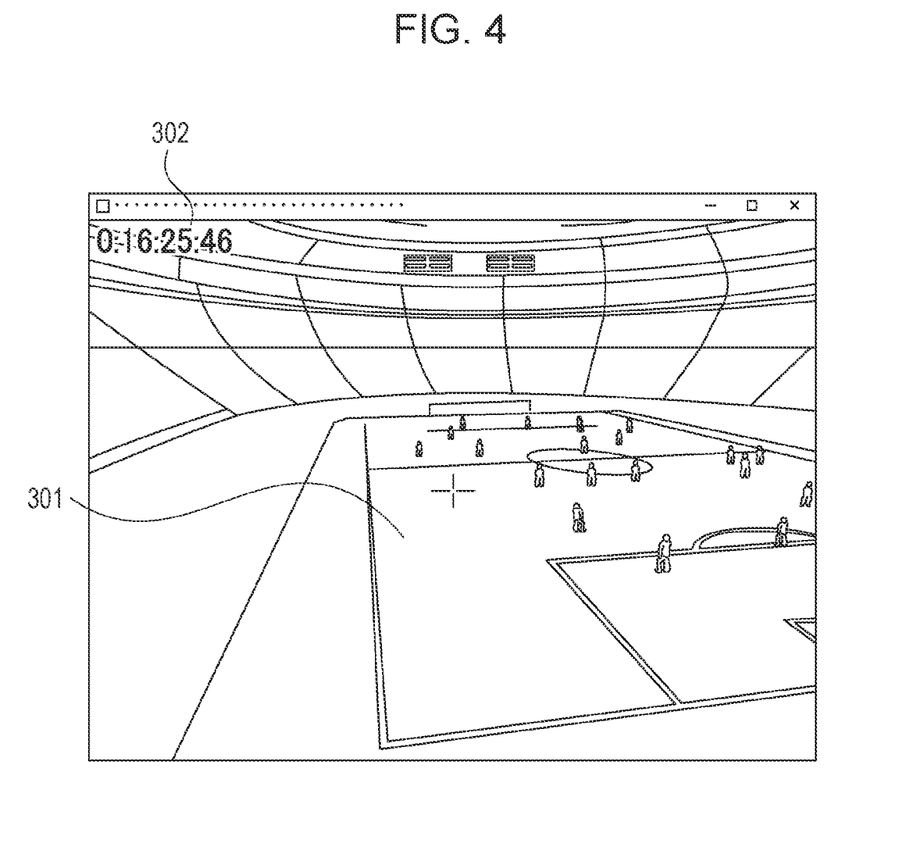
FIG. 4 is a diagram illustrating an example of a camera view window.

FIG. 4 is a diagram illustrating an example of a camera view window. A camera view window is a window for displaying a virtual viewpoint image received from the generation server 102. The information processing apparatus 103 displays, for example, a camera view window including a virtual viewpoint image received from the generation server 102 on the display device 201. The camera view window includes the camera view 301 and a time region 302.

The camera view 301 is a display region where a virtual viewpoint image received from the generation server 102 is displayed. The virtual viewpoint image displayed in the camera view 301 is a virtual viewpoint image seen from a virtual camera operated by the user through, for example, the controller 202. By controlling the playback time in virtual viewpoint image content, the information processing apparatus 103 can display a virtual viewpoint image for an arbitrary time. The time region 302 shows a time corresponding to a drawing target, which is a virtual viewpoint image, displayed in the camera view 301 (for example, the time when images used to generate the virtual viewpoint image were captured). The information processing apparatus 103 may display, in the time region 302, the playback time of the virtual viewpoint image displayed in the camera view 301 in the virtual viewpoint image content.

Figure 5:
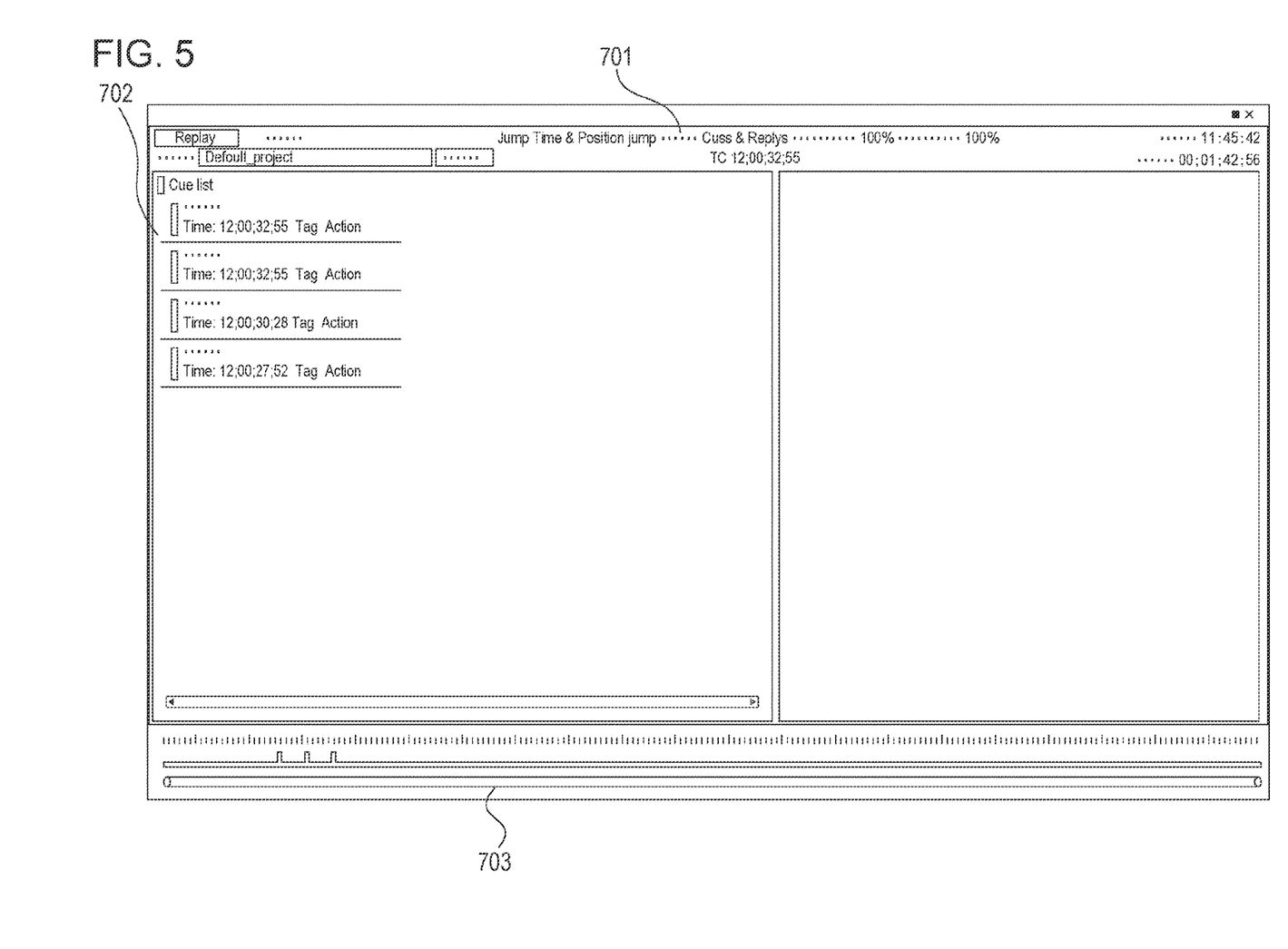
FIG. 5 is a diagram illustrating an example of a replay window.

FIG. 5 is a diagram illustrating an example of a replay window. A replay window is a window for displaying, for example, generation conditions, a reproduction condition, and a playback time in virtual viewpoint image content that were stored in the past. In addition, the replay window is also used to accept a command to change the playback time and a command to change the reproduction condition. The replay window includes a reproduction condition indicator 701, a list 702, and a time line 703. The information processing apparatus 103 displays the replay window on, for example, the display device 201.

The reproduction condition indicator 701 displays a reproduction condition. In the present embodiment, reproduction conditions include 'Time' indicating that only the corresponding time is a reproduction target and 'Time & Position' indicating that the corresponding time and the position and orientation of the virtual camera are reproduction targets. The reproduction condition indicator 701 also functions as a button for accepting a command to change the reproduction condition. When detecting a click performed by the user on the reproduction condition indicator 701 through, for example, the controller 203, the mouse, or the display device 201, the information processing apparatus 103 accepts a command to change the reproduction condition and changes the reproduction condition to a condition that differs from the current one.

The list 702 displays a list of objects indicating generation conditions stored in the past in a list manner. In the present embodiment, the generation conditions stored in the past are stored in a queue format in a storage unit such as the ROM 113. When detecting specification performed by the user on an object in the list 702 through, for example, the controller 203, the mouse, or the display device 201, the information processing apparatus 103 reproduces the generation conditions corresponding to the object indicated by the detected specification.

The time line 703 is a seek-bar object showing the total playback time of virtual viewpoint image content to be played back and the current playback time. By operating the time line 703, the scene at an arbitrary time can be played back. For example, when detecting specification of a point performed by the user on the seek bar of the time line 703 through, for example, the controller 203, the mouse, or the display device 201, the information processing apparatus 103 performs the following. That is, the information processing apparatus 103 displays, in the camera view 301 of the camera view window, a virtual viewpoint image corresponding to the time indicated by the specified point. In that case, the information processing apparatus 103 may specify, for example, generation conditions corresponding to the time among the stored generation conditions and reproduce conditions indicated by the specified generation conditions. A graphical user interface (GUI) of the replay window enables the user to perform a discontinuous time operation to an arbitrary time.

In the present embodiment, suppose that the information processing apparatus 103 is a single information processing apparatus and that the camera view window and the replay window are displayed on a single display device 201. However, the information processing apparatus 103 may cause two display devices 201 each to display the camera view window and the replay window.

It may be supposed that the information processing apparatus 103 is a system including two information processing apparatuses, and the individual information processing apparatuses included in the system may each generate the camera view window and the replay window and display these windows on a display device connected thereto.

FIG. 6 is a diagram illustrating an example of a functional configuration of the information processing apparatus 103 in the present embodiment. The information processing apparatus 103 includes an input-output control unit 501, a virtual camera control unit 502, a time control unit 503, a management unit 504, a communication control unit 505, and a reproduction condition control unit 506. In the present embodiment, the position and orientation (the virtual viewpoint and virtual line of sight) of the virtual camera are treated as virtual camera parameters; however, the position, orientation, and angle of view (the virtual viewpoint, virtual line of sight, and virtual angle of view) of the virtual camera may be treated as virtual camera parameters. That is, the generation conditions include the virtual camera parameters.

The input-output control unit 501 accepts user input through an input device connected to the input-output unit 115. In the present embodiment, the input-output control unit 501 accepts input through, for example, the controller 202 and the controller 203. The input-output control unit 501 accepts, for example, selection of the reproduction condition indicator 701, selection of an object included in the list 702, and specification of a point on the seek bar of the time line 703. In addition, the input-output control unit 501 displays, for example, a virtual viewpoint image input from the communication control unit 505 on the display device 201.

The virtual camera control unit 502 acquires, from the input-output control unit 501, a command to change the virtual camera parameters received through the controller 202 by the input-output control unit 501 and controls the virtual camera parameters in accordance with the acquired command. That is, the virtual camera control unit 502 updates the current state of the virtual camera.

In addition, when the playback time in the virtual viewpoint image content is changed by the time control unit 503, the virtual camera control unit 502 may update the virtual camera parameters on the basis of the reproduction condition. In other words, in a case where the reproduction condition is 'Time & Position', the virtual camera control unit 502 performs the following processing. That is, the virtual camera control unit 502 updates the current virtual camera parameters to virtual camera parameters included in the generation conditions corresponding to the post-change time among the generation conditions stored in the ROM 113 and managed by the management unit 504.

The time control unit 503 controls a time indicating which time a scene (a virtual viewpoint image) in the virtual viewpoint image content is to be generated for. The time control unit 503 performs the following processing in a case where there is not an operation input regarding control of the playback time from the input-output control unit 501, in other words, in a case where the user does not specify a time through the controller 203. That is, the input-output control unit 501 increases the playback time by one frame after a predetermined period (for example, 16 milliseconds, 32 milliseconds, or 1 second) has elapsed. For example, in a case where virtual viewpoint image content is played back at 60 fps (in a case where 60 virtual viewpoint images are generated per second), the time control unit 503 increases the playback time by one frame every 16 milliseconds.

In a case where the user has performed an operation regarding control of the playback time through the controller 203, the time control unit 503 controls the playback time in accordance with the operation. As operations regarding control of the playback time, there are continuous time operations (fast forward, rewind) through the controller 203. In addition, as operations regarding control of the playback time, there are an operation for selecting an object in the list 702 and an operation for specifying a point on the seek bar of the time line 703.

The management unit 504 performs the following processing on all the frames (virtual viewpoint images) played back (generated) in the virtual viewpoint image content. That is, the management unit 504 associates the virtual camera parameters corresponding to a virtual viewpoint image with the playback time corresponding to the virtual viewpoint image, and stores and manages them as the generation conditions of the virtual viewpoint image in the ROM 113.

In addition, when accepting information indicating that the storage command button has been pressed down through the controller 203 from the input-output control unit 501, the management unit 504 performs the following processing. That is, the management unit 504 associates the virtual camera parameters with the playback time of the virtual viewpoint image displayed in the camera view 301 in the virtual viewpoint image content when the storage command button is pressed down, and treats them as generation conditions. The management unit 504 then stores, in the ROM 113, condition information indicating the generation conditions as data in a queue format. That is, the condition information indicating the generation conditions storage of which is explicitly intended by the user is stored in this data in the queue format. The processing in which the management unit 504 stores the condition information when the storage command button is pressed down is an example of storage control processing.

The communication control unit 505 communicates with the generation server 102 via the communication unit 114. The communication control unit 505 transmits information on generation conditions (virtual camera parameters controlled by the virtual camera control unit 502 and a playback time controlled by the time control unit 503) to the generation server 102. In addition, the communication control unit 505 outputs a virtual viewpoint image received from the generation server 102 to the input-output control unit 501.

The reproduction condition control unit 506 controls the reproduction condition. The reproduction condition control unit 506 changes the reproduction condition upon acquiring information indicating that a command to change the reproduction condition is accepted from the input-output control unit 501. In accordance with selection of the reproduction condition indicator 701 or pressing of a button of the controller 203, the pressing being performed by the user, the reproduction condition control unit 506 controls the reproduction condition. The reproduction condition control unit 506 switches, for example, between 'Time' mode and 'Time & Position' mode.

FIG. 7 is a flow chart illustrating an example of processing performed by the information processing apparatus 103. The processing illustrated in FIG. 7 is started at the timing when the information processing apparatus 103 starts playing back a virtual viewpoint image in accordance with an input playback command. That is, each process illustrated in FIG. 7 is a process performed while the virtual viewpoint image is being displayed on the display device. Note that the timing at which the processing illustrated in FIG. 7 is started is not limited to this.

In S1010, the input-output control unit 501 performs control such that the processing from S1020 to S1150 is repeated on the basis of an operation through the input device connected to the input-output unit 115 until a command to end the processing in FIG. 7 is accepted. The input-output control unit 501 may perform control such that the processing from S1020 to S1150 is repeated so as to continue the processing in FIG. 7 for a predetermined period.

In S1020, the input-output control unit 501 acquires an input corresponding to an operation performed by the user through the input device connected to the input-output unit 115. In the following, this acquired input is referred to as user input. The user input indicates, for example, a command to update virtual camera parameters (an input corresponding to a viewpoint change operation), a command to change a playback time (an input corresponding to a switching operation), a command to change a reproduction condition (an input corresponding to a specification operation), and a command to store generation conditions as data in a queue format (an input corresponding to a setting operation).

In S1030, the virtual camera control unit 502 determines whether the user input acquired in S1020 indicates a command to operate virtual camera parameters. In a case where the virtual camera control unit 502 determines that the user input acquired in S1020 indicates a command to operate virtual camera parameters, the process proceeds to processing in S1040. In a case where the virtual camera control unit 502 determines that the user input acquired in S1020 does not indicate a command to operate virtual camera parameters, the process proceeds to processing in S1060.

In S1040, the virtual camera control unit 502 updates the virtual camera parameters (the virtual viewpoint and the virtual line of sight) on the basis of the user input acquired in S1020. For example, the virtual camera control unit 502 updates information indicating the current virtual camera parameters and stored in the ROM 113 to the parameters indicated by the user input acquired in S1020.

In S1050, the time control unit 503 updates the playback time by increasing the playback time by one frame. For example, the time control unit 503 updates information indicating the current playback time for the virtual viewpoint images and stored in the ROM 113 so as to indicate the time obtained by increasing the current time by one frame.

In S1060, the time control unit 503 determines whether the user input acquired in S1020 indicates a command to change the playback time. In a case where the time control unit 503 determines that the user input acquired in S1020 indicates a command to change the playback time, the process proceeds to processing in S1070. In a case where the time control unit 503 determines that the user input acquired in S1020 does not indicate a command to change the playback time, the process proceeds to processing in S1110.

In S1070, the reproduction condition control unit 506 acquires the current reproduction condition by reading reproduction condition information stored in the ROM 113.

In S1080, the reproduction condition control unit 506 determines whether the reproduction condition acquired in S1070 is 'Time'. In a case where the reproduction condition control unit 506 determines that the reproduction condition acquired in S1070 is 'Time', the process proceeds to processing in S1090. In a case where the reproduction condition control unit 506 determines that the reproduction condition acquired in S1070 is not 'Time', the reproduction condition control unit 506 determines that the reproduction condition is 'Time & Position', and the process proceeds to processing in S1100.

In S1090, the time control unit 503 controls the playback time on the basis of the user input acquired in S1020. For example, the time control unit 503 updates information indicating the current playback time for the virtual viewpoint images and stored in the ROM 113 so as to indicate the playback time indicated by the user input. In this case, the position and direction of the virtual viewpoint are not updated. That is, the playback time is changed while maintaining settings for the position and direction of the virtual viewpoint of the virtual viewpoint image displayed at the time of detection of the user input. In this manner, by determining a generation time (an item corresponding to a drawing target), which is a generation condition used when a virtual viewpoint image is generated anew, the virtual camera control unit 502 reproduces the generation conditions stored in the past.

In S1100, from the generation conditions corresponding to the condition information stored in the ROM 113, the virtual camera control unit 502 specifies generation conditions which are included in the generation conditions and for which the time corresponding to the drawing target is the time indicated by the user input acquired in S1020. The virtual camera control unit 502 then acquires virtual camera parameters (a virtual viewpoint and a virtual line of sight) indicated by the specified generation conditions. The virtual camera control unit 502 updates information indicating the current virtual parameters and stored in the ROM 113 with the acquired virtual camera parameters. In this manner, by determining virtual camera parameters, which are generation conditions used when a virtual viewpoint image is generated anew, the virtual camera control unit 502 reproduces the generation conditions stored in the past.

In S1110, the reproduction condition control unit 506 determines whether the user input acquired in S1020 indicates a command to change the reproduction condition. In a case where the reproduction condition control unit 506 determines that the user input acquired in S1020 indicates a command to change the reproduction condition, the process proceeds to processing in S1120. In a case where the reproduction condition control unit 506 determines that the user input acquired in S1020 does not indicate a command to change the reproduction condition, the process proceeds to processing in S1130.

In S1120, the reproduction condition control unit 506 changes the reproduction condition in accordance with the user input acquired in S1020 and indicating a command to change the reproduction condition. For example, in a case where information indicating the reproduction condition and stored in the ROM 113 indicates Time, the reproduction condition control unit 506 changes the information indicating the reproduction condition and stored in the ROM 113 so as to indicate 'Time & Position'. In a case where the information indicating the reproduction condition and stored in the ROM 113 indicates 'Time & Position', the reproduction condition control unit 506 changes the information indicating the reproduction condition and stored in the ROM 113 so as to indicate 'Time'. In this manner, the reproduction condition control unit 506 changes playback conditions.

In addition, the user may specify which condition is to be the reproduction condition through the input device connected to the input-output unit 115. In that case, the user input acquired in S1020 includes information indicating which condition is to be the reproduction condition, and thus the reproduction condition control unit 506 may change the information indicating the reproduction condition and stored in the ROM 113 to the condition indicated by the user input.

In S1130, the time control unit 503 increases the playback time by one frame. For example, the time control unit 503 updates information indicating the current playback time for the virtual viewpoint images and stored in the ROM 113 so as to indicate the time obtained by increasing the current time by one frame.

In S1140, the management unit 504 acquires the playback time currently indicated by the time line 703 of the replay window and the virtual camera parameters used to generate the virtual viewpoint image currently displayed in the camera view 301 of the camera view window. The management unit 504 acquires this playback time and the virtual camera parameters by reading, for example, information indicating the current playback time and information indicating the current virtual camera parameters, the pieces of information being stored in the ROM 113. The management unit 504 then associates the acquired playback time and the virtual camera parameters with each other and stores them in the ROM 113 as condition information indicating generation conditions. The processing in S1140 is an example of storage control processing.

In S1150, by transmitting, to the generation server 102, information on the current virtual camera parameters and information on the current playback time, the pieces of information being indicated by the information stored in the ROM 113, the communication control unit 505 requests generation of a virtual viewpoint image under the generation conditions indicated by the transmitted information. About a situation corresponding to the playback time indicated by the received information, the generation server 102 generates a virtual viewpoint image using the virtual camera parameters indicated by the received information. The generation server 102 then transmits the generated virtual viewpoint image to the information processing apparatus 103.

The input-output control unit 501 displays the virtual viewpoint image transmitted from the generation server 102 in the camera view 301 of the camera view window displayed on the display device 201. In addition, the input-output control unit 501 changes the time line 703 of the replay window displayed on the display device 201 such that the playback time is pointed that is indicated by information on the current playback time indicated by the information stored in the ROM 113. The processing in S1150 is an example of generation control processing.

As above, in the present embodiment, in response to playback time specification processing performed on the virtual viewpoint image content, the image processing system 10 reproduces the playback time and the virtual camera parameters, which are generation conditions, on the basis of the generation conditions and the reproduction conditions stored in the past.

For example, in a case where the reproduction condition is 'Time & Position', the image processing system 10 updates, in accordance with the change of the playback time, the virtual camera parameters to the ones for the state at the playback time. As a result, the image processing system 10 can enable an operation, as though to rewind the recorded scenes.

In addition, for example, in a case where the reproduction condition is 'Time', the image processing system 10 does not change the virtual camera parameters even when the playback time specification processing is performed. As a result, the image processing system 10 can enable an operation for reviewing a scene in the past from the current position of the virtual camera.

In this manner, the image processing system 10 can reproduce the generation conditions stored in the past without requiring a user to perform an interactive operation using an operation unit, thereby further improving the ease of operation. Moreover, the image processing system 10 can enable more flexible operation on virtual viewpoint images.

In the present embodiment, in response to playback time specification processing performed on the virtual viewpoint image content, the image processing system 10 determines generation conditions for when a virtual viewpoint image is generated anew, on the basis of the generation conditions and the reproduction condition stored in the past. However, in response to execution of predetermined other processing, the image processing system 10 may determine generation conditions for when a virtual viewpoint image is generated anew, on the basis of the generation conditions and the reproduction condition stored in the past.

For example, in response to execution of processing for accepting an operation for selecting one of a plurality of objects displayed in the list 702, the operation being performed by the user through the input device connected to the input-output unit 115, the image processing system 10 may determine generation conditions for when a virtual viewpoint image is generated anew. In that case, for example, the input-output control unit 501 accepts, while a virtual viewpoint image is being displayed, an operation for selecting an object from a plurality of objects corresponding to a plurality of times, the operation being performed by the user. The virtual camera control unit 502 then updates information indicating the current virtual camera parameters and stored in the ROM 113 with the values of the virtual camera parameters included in the generation conditions indicated by the selected object. Moreover, the time control unit 503 updates information indicating the current playback time and stored in the ROM 113 with the value of the time included in the generation conditions indicated by the selected object. The communication control unit 505 then transmits, as generation conditions, the information on the current virtual camera parameters and information on the current playback time, the pieces of information being indicated by the information stored in the ROM 113, to the generation server 102 and requests a virtual viewpoint image generated under the transmitted generation conditions. The generation server 102 generates a virtual viewpoint image captured from the virtual camera having the virtual camera parameters indicated by the received information in the situation at the playback time indicated by the received information and transmits the virtual viewpoint image to the information processing apparatus 103. The information processing apparatus 103 displays the received virtual viewpoint image on the display unit. Note that, in a case where the virtual viewpoint image is displayed that corresponds to the generation conditions indicated by the object selected from the plurality of stored objects, the information processing apparatus 103 may select, in accordance with the set reproduction condition, which parameter is to be applied among a plurality of parameters serving as the generation conditions. For example, among a plurality of types of parameter including a parameter representing a time and a parameter representing the position or direction of a virtual viewpoint, only the type of parameter selected in accordance with the reproduction condition may be updated with a parameter included in the stored object.

In the present embodiment, the reproduction conditions include 'Time' condition and 'Time & Position' condition; however, the reproduction conditions may also include other conditions. For example, the reproduction conditions may also include 'All' referring to the state indicating updating of all conditions included in the generation conditions in response to execution of predetermined processing. In addition, for example, in a case where the reproduction condition is 'Position', the position or direction of the virtual viewpoint may be updated without updating the playback time so as to be in the state stored in the past. That is, in a case where a switching operation performed by the user is detected while a virtual viewpoint image is being displayed, a virtual viewpoint image may be displayed on the display unit, the virtual viewpoint image being the virtual viewpoint image of the next frame of the virtual viewpoint image that is being displayed and corresponding to the position or direction of the virtual viewpoint indicated by the stored object.

Second Embodiment

In the present embodiment, processing will be described in which the position, orientation, and zoom amount (the virtual viewpoint, virtual line of sight, and virtual angle of view) of a virtual camera are treated as virtual camera parameters. A zoom amount is a parameter that represents, in one variable, the angle of view of a virtual camera for when a virtual viewpoint video is generated. As a zoom amount, an angle of view may be expressed in angles or as the value into which the focal length of the lens is converted.

The system configuration of the image processing system 10 in the present embodiment is substantially the same as that in the first embodiment. In addition, the hardware configuration and functional configuration of each system structural element of the image processing system 10 in the present embodiment are substantially the same as those in the first embodiment.

In the present embodiment, the zoom amount of the virtual camera is controlled on the basis of, for example, operation performed by the user through a slider of the controller 202. Upon detecting operation of the slider of the controller 202, the information processing apparatus 103 updates the zoom amount of the virtual camera in accordance with the details of the detected operation.

In the present embodiment, the reproduction condition is defined by a combination of variables corresponding to the position, orientation, and zoom amount of the virtual camera on a one-to-one basis, each variable being expressed by one of two states, ON and OFF. Each of the variables allocated to the position, the orientation, and the zoom amount on a one-to-one basis is a variable showing as to whether to be updated. In a case where a variable included in the reproduction condition is ON, when the playback time is specified, the image processing system 10 updates the virtual camera parameter (one of the position, the orientation, and the zoom amount) corresponding to the variable; however, in a case where the variable is OFF, the image processing system 10 does not update the virtual camera parameter corresponding to the variable.

Moreover, the reproduction condition may be defined by a combination of variables corresponding to seven axes on a one-to-one basis, the seven axes corresponding to the position (three axes), orientation (three axes), and zoom amount (one axis) of the virtual camera expressed by the virtual camera parameters, each variable being expressed by one of two states, ON and OFF. In that case, the variable allocated to each axis is a variable showing as to whether to be updated. In a case where a variable included in the reproduction condition is ON, when the playback time is specified, the image processing system 10 updates the virtual camera parameter (one of the axes of the position, the orientation, and the zoom amount) corresponding to the variable; however, in a case where the variable is OFF, the image processing system 10 does not update the virtual camera parameter corresponding to the variable.

The controller 202 in the present embodiment includes a slider for accepting a zoom amount (one axis) operation.

The controller 203 includes a button used to change the reproduction condition. In the present embodiment, about each of the position, orientation, and zoom amount of the virtual camera, the controller 203 includes a button for commanding switching between the values (ON/OFF) of the variable. However, about each axis of the position (three axes), orientation (three axes), and zoom amount (one axis) of the virtual camera, the controller 203 may include a button for commanding switching between the values of the variable.

Upon detecting pressing on these buttons of the controller 203, the input-output control unit 501 switches the values (ON/OFF) of the variable corresponding to the pressed button.

Figure 8:
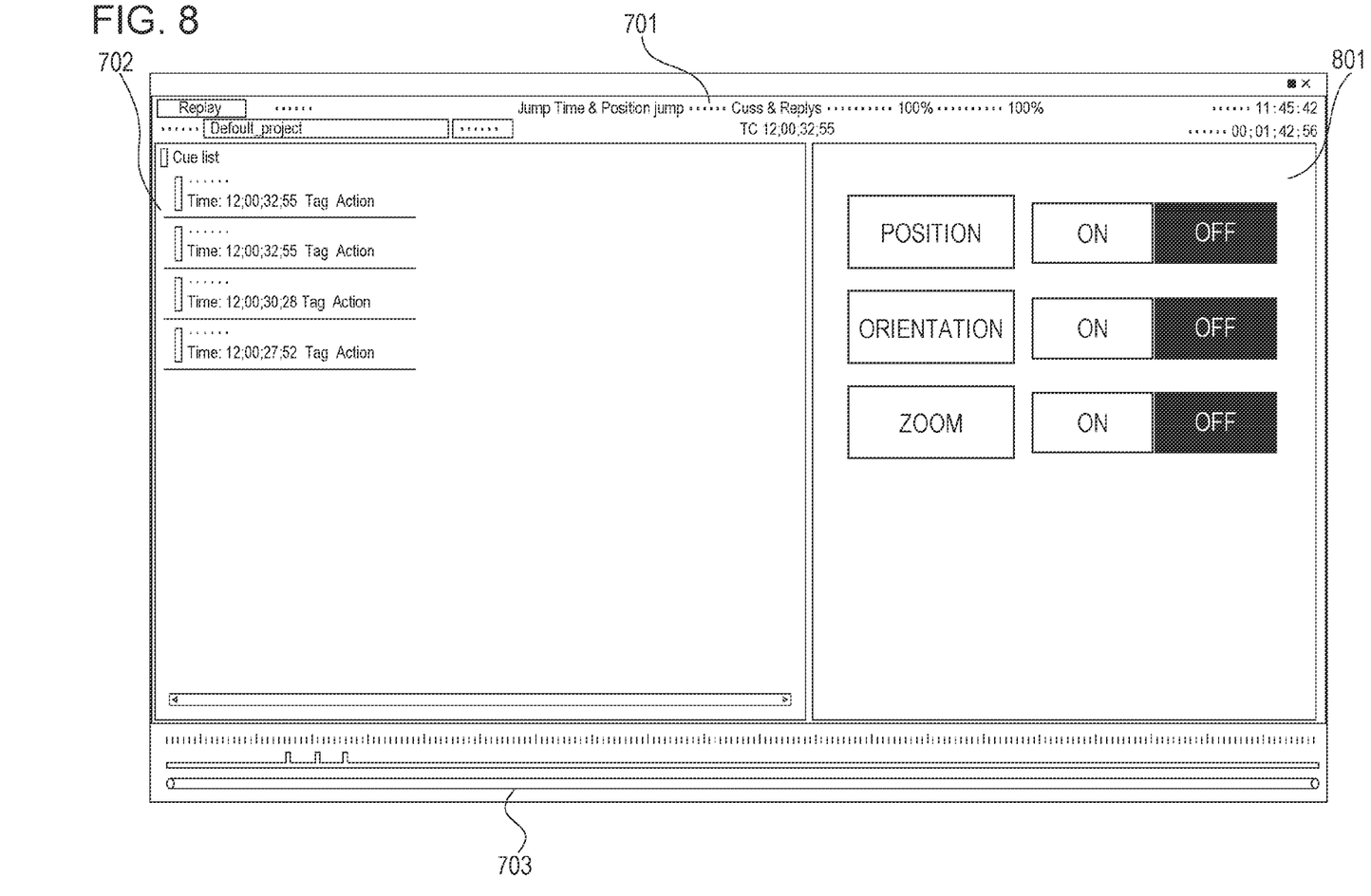
FIG. 8 is a diagram illustrating an example of a replay window.

FIG. 8 is a diagram illustrating an example of a replay window in the present embodiment. The replay window in the present embodiment differs from the replay window in the first embodiment illustrated in FIG. 5 in that the replay window in the present embodiment includes a reproduction condition setting switch 801. The reproduction condition setting switch 801 is an object showing the values of the variables each allocated to a corresponding one of the position, the orientation, and the zoom amount of the virtual camera. The state of the reproduction condition setting switch 801 is linked to the current reproduction condition. The input-output control unit 501 displays an object showing the current reproduction condition as the reproduction condition setting switch 801.

In the present embodiment, the input-output control unit 501 accepts a specification operation performed on the reproduction condition setting switch 801 by the user through an input device such as the controller 202 or 203. This specification operation is an example of operation for specifying the type of parameter to be reproduced. In a case where an operation performed on the reproduction condition setting switch 801 is accepted by the input-output control unit 501, the reproduction condition control unit 506 updates the current reproduction condition in accordance with the accepted operation.

The virtual camera control unit 502 acquires, from the input-output control unit 501, information indicating reception of an input indicating updating of the virtual camera parameters through the controller 202 and updates each of the virtual camera parameters in accordance with the acquired information. Moreover, in a case where the playback time is changed by the time control unit 503, the virtual camera control unit 502 specifies generation conditions corresponding to the playback time to which the value of the time corresponding to the drawing target is changed among the generation conditions indicated by the condition information stored in the ROM 113. About the virtual camera parameter for which the reproduction condition is ON, the virtual camera control unit 502 then updates information indicating the current virtual camera parameter to the value indicated by the specified generation conditions.

The reproduction condition control unit 506 acquires input indicating a command to change the reproduction condition through the controller 203, changes the reproduction condition, and reflects the changed reproduction condition in the state of the reproduction condition setting switch 801. Moreover, the reproduction condition control unit 506 acquires input of a command to change the reproduction condition through the reproduction condition setting switch 801 and changes the reproduction condition.

FIG. 9 is a flow chart illustrating an example of processing performed by the information processing apparatus 103 in the present embodiment. The processing in FIG. 9 differs from the processing in FIG. 7 in the first embodiment in that the processing in FIG. 9 has processing in S2010 and S2020 instead of processing in S1080, S1090, and S1100. The differences between the processing in FIG. 9 and that in the first embodiment will be described.

In S2010, from the generation conditions corresponding to the condition information stored in the ROM 113, the virtual camera control unit 502 specifies generation conditions which are included in the generation conditions and for which the time corresponding to the drawing target is the time indicated by the user input acquired in S1020. The virtual camera control unit 502 then acquires virtual camera parameters (the position, the orientation, and the zoom amount) indicated by the specified generation conditions. About the virtual camera parameter for which the reproduction condition is ON, the virtual camera control unit 502 updates information indicating the current virtual parameter and stored in the ROM 113 with the acquired virtual camera parameter.

In S2020, the time control unit 503 controls the playback time on the basis of the user input acquired in S1020. For example, the time control unit 503 updates information indicating the current playback time for the virtual viewpoint images and stored in the ROM 113 so as to indicate the playback time indicated by the user input.

As above, in the present embodiment, for each parameter (the position, the orientation, the zoom amount) included in the virtual camera parameters, the image processing system 10 reproduces the stored generation conditions in accordance with the reproduction condition. As a result, the image processing system 10 can determine more detailed generation conditions, thereby improving the ease of operation.

For example, in a state where the zoom amount is fixed to have a wider angle, when the reproduction condition corresponding to the zoom amount is set to OFF and the playback time is changed, the image processing system 10 can play back a virtual viewpoint image in which a past scene is drawn to have a wider range.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

For example, a portion or the entirety of the functional configuration of the above-described image processing system may be implemented as hardware on the information processing apparatus 103.

In the above, an example of the embodiments of the present disclosure has been described; however, the present disclosure is not limited to the specific embodiments. The present disclosure may include an embodiment obtained by arbitrarily combining the above-described individual embodiments and an embodiment obtained by improving or applying the above-described individual embodiments as appropriate.

According to the above-described embodiments, the ease of operation regarding the setting of a virtual viewpoint can be improved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
obtain a first set and a second set of a plurality of parameters for generation of a virtual viewpoint image based on a plurality of captured images, the plurality of parameters including a parameter representing a time, a parameter representing a position of a virtual viewpoint and a parameter representing a direction of view from the virtual viewpoint;
obtain input information to select a mode from a plurality of modes included a first mode and a second mode; and
change, in a case where the first mode is selected, a parameter representing a time corresponding to the second set to a parameter representing a time corresponding to the first set, without changing a parameter representing a position of a virtual viewpoint and a parameter representing a direction of view from a virtual viewpoint corresponding to the second set, and
change, in a case where the second mode is selected, a parameter representing a time, a parameter representing a position of a virtual viewpoint and a parameter representing a direction of view from a virtual viewpoint corresponding to the second set, to a parameter representing a time, a parameter representing a position of a virtual viewpoint and a parameter representing a direction of view from a virtual viewpoint corresponding to the first set.

2. The information processing apparatus according to claim 1, wherein the one or more processors further execute the instructions to cause a storage device to store the changed parameter.

3. The information processing apparatus according to claim 1, wherein the one or more processors further execute the instructions to:
obtain multiple parameter sets of the plurality of parameters, the multiple parameter sets including the first set and the second set.

4. The information processing apparatus according to claim 3, wherein the input information include information indicating an input selecting the first set among the multiple parameter sets.

5. The information processing apparatus according to claim 1, wherein the obtained plurality of parameters include a parameter representing an angle of view of the virtual viewpoint.

6. The information processing apparatus according to claim 1, wherein the input information is information indicating the input to select either a first object corresponding to the first mode or a second object corresponding to the second mode.

7. The information processing apparatus according to claim 6, wherein the one or more processors further execute the instructions to:
cause a display device to display either the first object or the second object.

8. The information processing apparatus according to claim 1, wherein the plurality modes includes a third mode, and
wherein the one or more processors further execute the instructions to:
change, in a case where the third mode is selected, a parameter representing a position of a virtual viewpoint and a parameter representing a direction of view from a virtual viewpoint corresponding to the second set to a parameter representing a position of a virtual viewpoint and a parameter representing a direction of view from a virtual viewpoint corresponding to the first set, without changing a parameter representing a time corresponding to the second set.

9. An information processing method comprising:
obtaining a first set and a second set of a plurality of parameters for generation of a virtual viewpoint image based on a plurality of captured images, the plurality of parameters including a parameter representing a time, a parameter representing a position of a virtual viewpoint and a parameter representing a direction of view from the virtual viewpoint;
obtaining input information to select a mode from a plurality of modes included a first mode and a second mode; and
changing, in a case where the first mode is selected, a parameter representing a time corresponding to the second set to a parameter representing a time corresponding to the first set, without changing a parameter representing a position of a virtual viewpoint and a parameter representing a direction of view from a virtual viewpoint corresponding to the second set, and
change, in a case where the second mode is selected, a parameter representing a time, a parameter representing a position of a virtual viewpoint and a parameter representing a direction of view from a virtual viewpoint corresponding to the second set, to a parameter representing a time, a parameter representing a position of a virtual viewpoint and a parameter representing a direction of view from a virtual viewpoint corresponding to the first set.

10. A non-transitory computer-readable storage medium storing a computer program for causing a computer to execute an information processing method comprising:
obtaining a first set and a second set of a plurality of parameters for generation of a virtual viewpoint image based on a plurality of captured images, the plurality of parameters including a parameter representing a time, a parameter representing a position of a virtual viewpoint and a parameter representing a direction of view from the virtual viewpoint; and obtaining input information to select a mode from a plurality of modes included a first mode and a second mode; and changing, in a case where the first mode is selected, a parameter representing a time corresponding to the second set to a parameter representing a time corresponding to the first set, without changing a parameter representing a position of a virtual viewpoint and a parameter representing a direction of view from a virtual viewpoint corresponding to the second set, and change, in a case where the second mode is selected, a parameter representing a time, a parameter representing a position of a virtual viewpoint and a parameter representing a direction of view from a virtual viewpoint corresponding to the second set, to a parameter representing a time, a parameter representing a position of a virtual viewpoint and a parameter representing a direction of view from a virtual viewpoint corresponding to the first set.

* * * * *